United States Patent

[11] 3,610,658

| [72] | Inventor | Osvaldo F. Sartori |
| | | 4408 23rd St., Sacramento, Calif. 95822 |
| [21] | Appl. No. | 852,161 |
| [22] | Filed | Aug. 22, 1969 |
| [45] | Patented | Oct. 5, 1971 |

[54] STAIRWAY AND WHEEL CARRIER FOR TRUCK CAMPERS
8 Claims, 9 Drawing Figs.

[52] U.S. Cl. .................................................. 280/164,
280/166, 224/42.01, 224/42.06, 214/454
[51] Int. Cl. ........................................................ B60r 3/00
[50] Field of Search ............................................ 214/451,
452, 453, 454; 224/42.06, 42.08, 42.01, 42.03;
293/69; 280/164, 166

[56] References Cited
UNITED STATES PATENTS

| 3,392,990 | 7/1968 | Wolf .......................... | 280/166 X |
| 3,492,020 | 1/1970 | Musgrave ..................... | 280/166 |
| 3,507,514 | 4/1970 | Betz ........................... | 280/164 |

Primary Examiner—Gerald M. Forlenza
Assistant Examiner—Jerold M. Forsberg
Attorney—Berman, Davidson and Berman ABSTRACT: A stairway and wheel carrier for truck camper comprising a wheel mount structure with means for attaching a spare tire thereto, a plurality of adjustable step members secured to said structure, hinge means on one end of said structure for connecting it to a bumper of a vehicle and sliding latch means adapted to be connected to a bumper and adapted to extend through the hinged end of said structure to secure said structure and spare tire carried therein in an upright position.

INVENTOR
OSVALDO F. SARTORI

BY Berman, Davidson & Berman
ATTORNEYS

STAIRWAY AND WHEEL CARRIER FOR TRUCK CAMPERS

The present invention relates to a folding step assembly particularly adapted for use with a truck camper and the like with means for carrying a spare tire thereon.

It is an object of the present invention to provide a stairway of a rigid type which carries a spare tire or wheel mount on its rear surface and which further utilizes the spare tire to support the bottom of the stairway when it is in a lowered position.

It is another object of the present invention to provide a vehicle folding step assembly and spare tire carrier having a plurality of steps thereon, which steps are adjustable so that the assembly can be used with vehicles and campers that have bumpers disposed at different vertical heights with respect to the road surface upon which the vehicle travels.

It is yet another object of the present invention to provide a combination stairway of a rigid type which carries a spare tire and with means for securing the assembly to the bumper of a vehicle so that the assembly does not have to be permanently attached to the vehicle.

It is still a further object of the present invention to provide a foldable stairway assembly which carries a spare tire which assembly can be disposed in an upright vertical position with lock means to prevent the door of a camper carried by a truck body from being inadvertently opened.

It is still another object of the present invention to provide a stairway of a rigid type which carrier a spare tire and which is of a construction which permits the spare tire to be mounted adjacent the rear end of a truck bed and eliminates the cumbersome wheel mounts under truck bed wherein it is almost impossible to remove said wheel when one has a flat tire or is stuck in mud or snow.

Various other objects and advantages of the present invention will be readily apparent from the following detailed description when considered in connection with the accompanying drawings forming a part thereof and in which FIG. 1 is a side elevational view of the stairway assembly and wheel mount carried thereby shown in an upright locked position and shown in dotted lines when it is being utilized in a downward position as a stairway.

Figure 1:
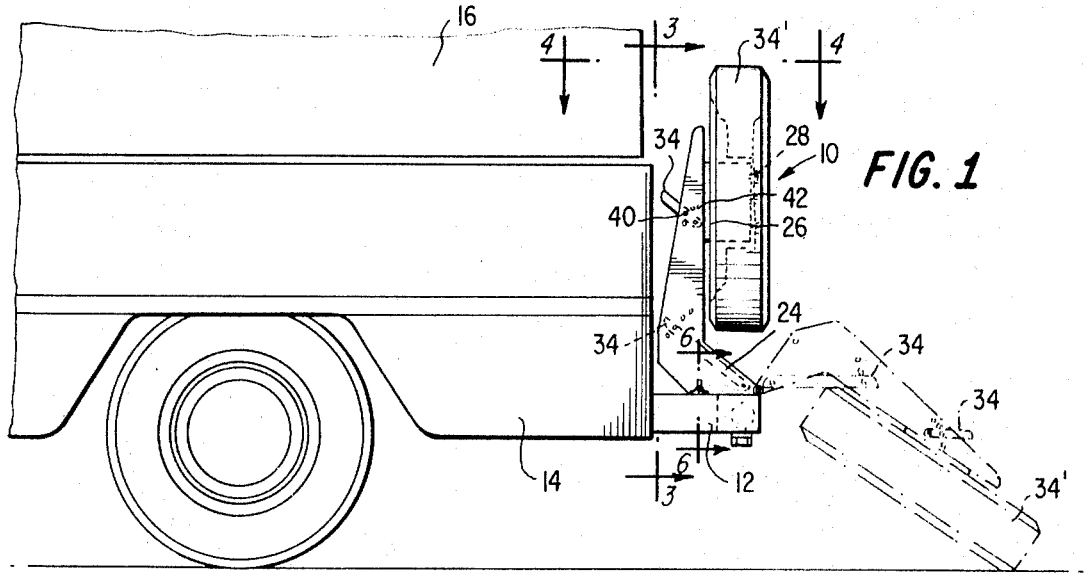

Referring to the drawings, the reference numeral 10 generally designates the stairway or foldable step assembly and tire mount hingedly connected to a bumper 12 of a truck body 14 which carries a truck camper 16. The assembly is provided with two laterally spaced parallel and vertically extending structural members 18 with a traverse plate 20 extending therebetween so as to form a channel or stairwell indicated at 22. The lower ends of the structural members 18 are inclined at an angle as indicated at 24 so that the overall structure is somewhat of an L-shaped configuration.

The transverse plate 20 is provided with a hollow cylindrical member or sleeve 26 extending rearwardly thereof with a plurality of bolts or lugs 28 thereon adapted to receive a wheel mount which carries a spare tire 34'. The structural member 18 have secured thereto steps 34. These steps 34 extend between the structural members 18 and are disposed in the stairwell 22. By providing a pivot bolt 36 adjacent the inner end of the steps or the portion of the steps adjacent to the plate 20 and providing another pair of bolts 38 with wingnuts 40 adjacent the portion of the steps disposed away from the transverse plate 20, the steps can be readily adjusted. It will also be noted that the portion of the structural members 18 adjacent the bolts 38 are provided with a series of apertures 42 therein so that the bolts 38 and the wingnuts 40 can be disposed in various holes or apertures 42 in order to make the steps 34 adjustable.

The rear end of the inclined portion 24 of the structural members 18 is hingedly connected by a hinge member or assembly 44 to the bumper 12 so that the tire assembly 10 may be swung from the upright position shown in FIG. 1 to a downward position indicated by dot-dash lines in FIG. 1, at which time, the tire 34' is disposed on the ground surface 48 and the stairway is in an operable position.

Figure 2:
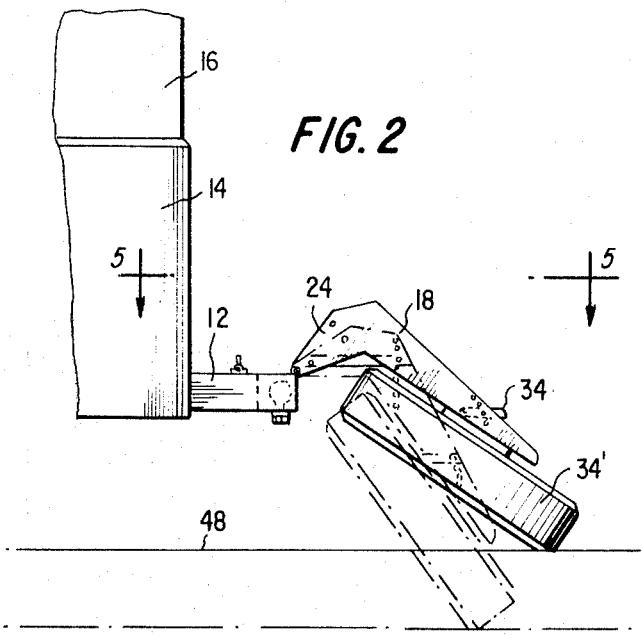
FIG. 2 is a view similar to FIG. 1 but illustrating the stairway in a down position on vehicles which have different truck heights.
Figure 3:
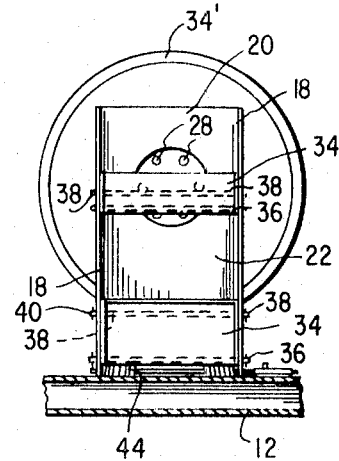
FIG. 3 is a view taken along the lines 3—3 of FIG. 1.

Referring to FIG. 2, it will be noted that there are two ground surfaces indicated therein, one in solid lines and one in dot-dash lines, which ground surfaces are shown for illustrative purposes to indicate how the stairway assembly can have its steps adjusted in the various apertures 42 in order to compensate for the different truck heights, so that the steps are adjusted to a level position no matter what the ground level or truck height is.

Figure 6:
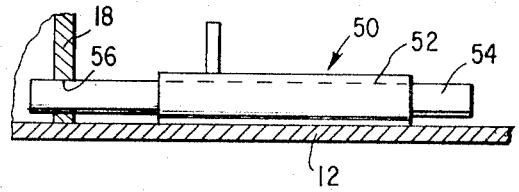
FIG. 6 is an enlarged detailed view taken along the lines 6—6 of FIG. 1 illustrating the locking means embodied in the device.

Referring to FIG. 6, it will be seen that the bumper 12 has disposed thereon a sliding bolt assembly 50 comprising a sleeve 52 and a sliding bolt 54 that has its inner end adapted to extend into the aperture 56 in the structural member 18 so as to lock the assembly 10 in an upright position when it is not being used as a stairway. When the bolt is disposed in the aperture 56 to lock the assembly in an upright position, the back door of the camper 16 cannot be inadvertently opened as the structure prevents the opening thereof.

Referring to the embodiment of the invention shown in FIG. 7, this is substantially the same as that described in connection with FIGS. 1 through 6, except that the assembly 10 is hingedly connected to a plate 58 welded to a plurality of vertical spacers 60 of any desired height secured to the bumper in any desired manner so as to adjust the height of the assembly 10.

Figure 7:
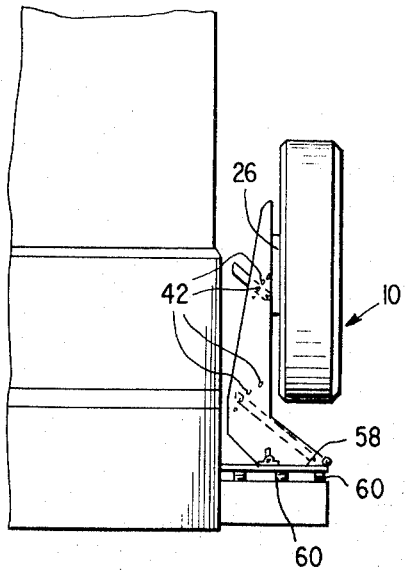
FIG. 7 is a side elevational view similar to FIG. 1 but illustrating the stairway assembly welded to spacers.
Figure 8:
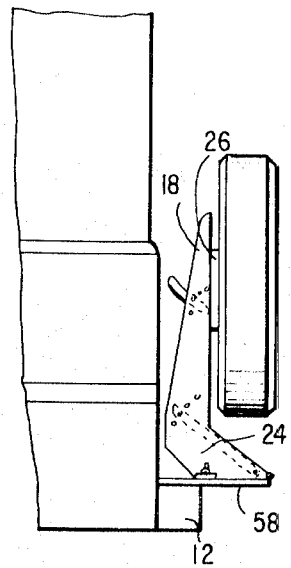
FIG. 8 is a view similar to FIG. 7 but illustrating the stairway assembly hinged to a plate that is welded to the bumper of a vehicle.

With respect to the embodiment illustrated in FIG. 8, this is identical to that shown in FIG. 7, except that the plate 58 is welded directly to the bumper 12 and can be welded to any width bumper.

Figure 9:
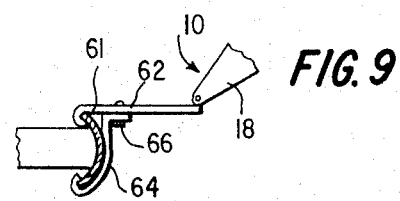
FIG. 9 is a detailed view illustrating the structure rigidly connected to a plate that is detachably secured by bolt means to the bumper of the vehicle.
Figure 4:
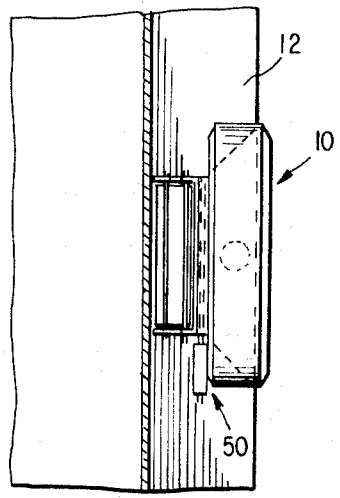
FIG. 4 is a view taken along the lines 4—4 of FIG. 1.
Figure 5:
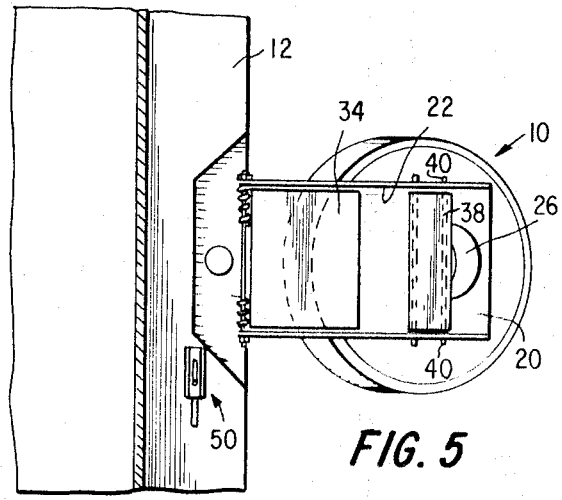
FIG. 5 is a view taken along the lines 5—5 of FIG. 2.

With respect to the embodiment illustrated in FIG. 9, the assembly 10 is identical to that already described and is hingedly connected to a curved bumper 61 by a flat plate 62 and a curved plate 64 having bent over rims connected to the bumper 61 and bolted together at 66.

Inasmuch as changes may be made in the form, location and relative arrangement of the several parts without departing from the essential characteristics of the invention, it is to be understood that this invention is not to be limited except by the scope of the appended claims.

What is claimed is:

1. The combination of a pivoted stairway and wheel carrier assembly comprising structural members with means thereon for hingedly connecting them to a vehicle, wheel-mounting means on one side of said members and plate means forming stairs on the other side of said structural members, wherein said structural members include two spaced parallel vertical members with a transverse member extending therebetween to form a channel-type stairwell, and said stairs include at least one plate extending across said channel stairwell and pivotally connected at its rear end to said vertical members and pin means adjacent the portion of said plate away from said transverse member for connection to said vertical members.

2. The combination of claim 1 wherein said vertical members have a plurality of opening means therein for receiving said pin means to provide adjustments for said step plate.

3. The combination of claim 2 wherein said wheel mount is a hollow cylindrical member and a tire is mounted thereon.

4. The combination of claim 3 wherein said structural members have inclined lower portions and hinge means are connected thereto.

5. The combination of claim 4 wherein a flat plate is secured to said hinge means and said plate is welded to a vehicle bumper.

6. The combination of claim 4 wherein a flat plate and a curved plate are secured to each other and to said hinge means and said flat and curved plates have bent rims for clasping them to a bumper.

7. The combination of claim 5 wherein spacer means are secured to said flat plate and a bumper is secured to said spacer members.

8. The combination of claim 4 wherein a bumper is provided with slide bolt means thereon and aperture means are provided in one structural member to receive said slide bolt means to lock said assembly in an upright position.